US011595160B2

(12) United States Patent
Lee et al.

(10) Patent No.: US 11,595,160 B2
(45) Date of Patent: Feb. 28, 2023

(54) METHOD AND APPARATUS FOR SIDELINK COMMUNICATION BASED ON FEEDBACK

(71) Applicant: ELECTRONICS AND TELECOMMUNICATIONS RESEARCH INSTITUTE, Daejeon (KR)

(72) Inventors: Jung Hoon Lee, Daejeon (KR); Cheol Soon Kim, Daejeon (KR); Sung Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 38 days.

(21) Appl. No.: 17/218,269

(22) Filed: Mar. 31, 2021

(65) Prior Publication Data

US 2021/0320759 A1     Oct. 14, 2021

(30) Foreign Application Priority Data

Apr. 8, 2020  (KR) .................. 10-2020-0042932
Jul. 31, 2020 (KR) .................. 10-2020-0096359
Oct. 7, 2020  (KR) .................. 10-2020-0129493
Feb. 26, 2021 (KR) .................. 10-2021-0026128

(51) Int. Cl.
*H04L 1/18*       (2006.01)
*H04L 1/1812*     (2023.01)
*H04L 1/1829*     (2023.01)
*H04L 1/1867*     (2023.01)
*H04W 72/04*      (2023.01)
*H04W 72/0446*    (2023.01)
*H04W 72/0453*    (2023.01)
(Continued)

(52) U.S. Cl.
CPC .......... *H04L 1/1819* (2013.01); *H04L 1/0005* (2013.01); *H04L 1/1854* (2013.01); *H04L 1/1896* (2013.01); *H04W 72/0406* (2013.01); *H04W 72/0446* (2013.01); *H04W 72/0453* (2013.01); *H04W 92/18* (2013.01)

(58) Field of Classification Search
CPC ... H04L 1/1819; H04L 1/1854; H04L 1/1896; H04W 72/0446; H04W 92/18
See application file for complete search history.

(56) References Cited

U.S. PATENT DOCUMENTS

2016/0128066 A1   5/2016  Park et al.
2018/0234980 A1   8/2018  Li et al.
2019/0208506 A1*  7/2019  Baldemair ............ H04L 1/1825
(Continued)

FOREIGN PATENT DOCUMENTS

WO      2017/074131 A1   5/2017
WO      2018/169327 A1   9/2018
(Continued)

*Primary Examiner* — Jael M Ulysse
(74) *Attorney, Agent, or Firm* — Rabin & Berdo, P.C.

(57) ABSTRACT

An operation method of a receiving terminal in sidelink communications may comprise: receiving one or more transport blocks (TBs) from a transmitting terminal; generating hybrid automatic repeat request (HARQ) responses for code block groups (CBGs) included in each of the one or more TBs; selecting one or more HARQ responses from among the HARQ responses based on priorities; and transmitting the one or more HARQ responses to the transmitting terminal through a physical sidelink feedback channel (PSFCH) resource.

18 Claims, 11 Drawing Sheets

(51) Int. Cl.
*H04L 1/00* (2006.01)
*H04W 92/18* (2009.01)

(56) References Cited

U.S. PATENT DOCUMENTS

| | | | |
|---|---|---|---|
| 2019/0281603 A1 | 9/2019 | Oh et al. | |
| 2020/0106566 A1* | 4/2020 | Yeo | H04W 28/04 |
| 2020/0205165 A1* | 6/2020 | Huang | H04L 1/1861 |
| 2020/0266857 A1* | 8/2020 | Hwang | H04L 1/1819 |
| 2020/0280398 A1* | 9/2020 | Hwang | H04W 72/0446 |
| 2021/0028910 A1* | 1/2021 | Cheng | H04L 5/0094 |
| 2021/0050950 A1* | 2/2021 | Zhou | H04L 1/1854 |
| 2021/0050953 A1* | 2/2021 | Park | H04L 5/0094 |
| 2021/0136781 A1* | 5/2021 | Hosseini | H04W 72/10 |
| 2021/0144750 A1* | 5/2021 | Cao | H04W 72/0446 |
| 2021/0168762 A1* | 6/2021 | Huang | H04W 72/0446 |
| 2021/0212106 A1* | 7/2021 | Farag | H04W 72/0406 |
| 2022/0052792 A1* | 2/2022 | Lee | H04L 1/1812 |
| 2022/0095279 A1* | 3/2022 | Hwang | H04W 72/0406 |
| 2022/0109527 A1* | 4/2022 | Hwang | H04L 5/0055 |
| 2022/0132471 A1* | 4/2022 | Hwang | H04W 4/40 |
| 2022/0166557 A1* | 5/2022 | Lee | H04W 4/40 |

FOREIGN PATENT DOCUMENTS

| | | |
|---|---|---|
| WO | 2018/203669 A1 | 11/2018 |
| WO | 2019/029375 A1 | 2/2019 |
| WO | 2019/075238 A1 | 4/2019 |
| WO | 2020/032768 A1 | 2/2020 |

\* cited by examiner

RMSI CORESET mapping pattern #1

RMSI CORESET mapping pattern #2

RMSI CORESET mapping pattern #3

METHOD AND APPARATUS FOR SIDELINK COMMUNICATION BASED ON FEEDBACK

CROSS-REFERENCE TO RELATED APPLICATIONS

This application claims priority to Korean Patent Applications No. 10-2020-0042932 filed on Apr. 8, 2020, No. 10-2020-0096359 filed on Jul. 31, 2020, No. 10-2020-0129493 filed on Oct. 7, 2020, and No. 10-2021-0026128 filed on Feb. 26, 2021 with the Korean Intellectual Property Office (KIPO), the entire contents of which are hereby incorporated by reference.

BACKGROUND

1. Technical Field

The present disclosure relates to a sidelink communication technique for a communication system, and more specifically, to a sidelink communication technique based on feedback in response to data.

2. Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. For example, requirements of the NR system may include enhanced Mobile BroadBand (eMBB), Ultra Reliable Low Latency Communication (URLLC), and Massive Machine Type Communication (mMTC).

Sidelink communication may be performed in the NR system. In order to improve the performance of the sidelink communication, transmission of feedback information (e.g., acknowledgment (ACK) or negative ACK (NACK)) for sidelink data may be performed. For example, a first terminal may transmit data to a second terminal, and the second terminal may transmit feedback information for the data to the first terminal. In order to support this operation, a method of configuring a resource for transmission of feedback information in sidelink, a method of transmitting feedback information, and the like are required.

SUMMARY

Accordingly, exemplary embodiments of the present disclosure are directed to providing methods and apparatuses for transmitting and receiving hybrid automatic repeat request (HARQ) feedback information in a communication system.

According to a first exemplary embodiment of the present disclosure, an operation method of a receiving terminal in sidelink communications may comprise: receiving one or more transport blocks (TBs) from a transmitting terminal; generating hybrid automatic repeat request (HARQ) responses for code block groups (CBGs) included in each of the one or more TBs; selecting one or more HARQ responses from among the HARQ responses based on priorities; and transmitting the one or more HARQ responses to the transmitting terminal through a physical sidelink feedback channel (PSFCH) resource.

The PSFCH resource may be determined based on a CBG index associated with each of the one or more HARQ responses.

The priorities may be TB priorities, and when a plurality of TBs are received from the transmitting terminal, HARQ responses for CBGs included in a TB having a high priority among the plurality of TBs may be preferentially selected.

The priorities may be CBG priorities, and a HARQ response for a CBG having a lower index among the CBGs may be preferentially selected.

The priorities may be priorities of HARQ responses, and a HARQ response indicating an acknowledgment (ACK) among the HARQ responses may be preferentially selected.

A PSFCH format 1 for transmission of the one or more HARQ responses may be configured, and the PSFCH resource may be a resource for the PSFCH format 1.

The PSFCH format 1 may share a same resource region with a PSFCH format 0 for transmission of one HARQ response, and a transmission resource of the PSFCH format 1 may be indicated in a same manner as a transmission resource of the PSFCH format 0.

A resource region of the PSFCH format 1 may be configured independently from a resource region of a PSFCH format 0 for transmission of one HARQ response, and the resource region of the PSFCH format 1 may be indicated by a higher layer message and/or sidelink control information (SCI).

When a PSFCH format 0 and a PSFCH format 1 are configured, a PSFCH format used for transmission of the one or more HARQ responses may be selected according to a preconfigured rule.

According to a second exemplary embodiment of the present disclosure, an operation method of a transmitting terminal in sidelink communications may comprise: transmitting one or more transport blocks (TBs) to a receiving terminal through n subchannels; receiving, from the receiving terminal, one or more hybrid automatic repeat request (HARQ) responses selected based on priorities from among HARQ responses for code block groups (CBGs) included in each of the one or more TBs through a physical sidelink feedback channel (PSFCH) resource; and retransmitting a portion of the CBGs to the receiving terminal through m subchannels when retransmission is required for the portion of the CBGs among all CBGs included in the one or more TBs, wherein each of n and m is a natural number.

n may be greater than m, a subchannel having a lower index among the n subchannels may be preferentially selected, and the m subchannels selected among the n subchannels may be used for retransmission of the portion of the CBGs.

A first modulation and coding scheme (MCS) is used for transmission of the one or more TBs, a second MCS is used for retransmission of the portion of the CBGs, a coding rate according to the second MCS may be lower than a coding rate according to the first MCS, and a modulation order according to the second MCS may be lower than a modulation order according to the first MCS.

The priorities may be TB priorities, and when a plurality of TBs are transmitted, HARQ responses for CBGs included in a TB having a high priority among the plurality of TBs may be preferentially selected.

The priorities may be CBG priorities, and a HARQ response for a CBG having a lower index among the CBGs may be preferentially selected.

The priorities may be priorities of HARQ responses, and a HARQ response indicating an acknowledgment (ACK) among the HARQ responses may be preferentially selected.

The operation method may further comprise transmitting a bitmap indicating the portion of the CBGs retransmitted among all the CBGs.

According to a third exemplary embodiment of the present disclosure, a receiving terminal in sidelink communications may comprise a processor; a memory electronically communicating with the processor; and instructions stored in the memory, wherein when executed by the processor, the instructions cause the receiving terminal to: receive one or more transport blocks (TBs) from a transmitting terminal; generate hybrid automatic repeat request (HARQ) responses for code block groups (CBGs) included in each of the one or more TBs; select one or more HARQ responses from among the HARQ responses based on priorities; and transmit the one or more HARQ responses to the transmitting terminal through a physical sidelink feedback channel (PSFCH) resource.

The PSFCH resource may be determined based on a CBG index associated with each of the one or more HARQ responses.

A PSFCH format 1 for transmission of the one or more HARQ responses may be configured, the PSFCH format 1 may share a same resource region with a PSFCH format 0 for transmission of one HARQ response, and a transmission resource of the PSFCH format 1 may be indicated in a same manner as a transmission resource of the PSFCH format 0.

A PSFCH format 1 for transmission of the one or more HARQ responses may be configured, a resource region of the PSFCH format 1 may be configured independently from a resource region of a PSFCH format 0 for transmission of one HARQ response, and the resource region of the PSFCH format 1 may be indicated by a higher layer message and/or sidelink control information (SCI).

According to the exemplary embodiments of the present disclosure, a code block group (CBG)-based transmission scheme may be used in the sidelink communication. In this case, a feedback procedure may be performed on a CBG basis. A receiving terminal may transmit one or more HARQ responses selected according to priorities among a plurality of HARQ responses to a transmitting terminal. A new physical sidelink feedback channel (PSFCH) format may be used for transmission of a plurality of HARQ responses. The transmitting terminal may perform a retransmission procedure for a portion of CBGs. In the retransmission procedure, a changed modulation and coding scheme (MCS) may be used. In addition, the retransmission procedure may be performed using a portion of subchannels. Accordingly, in the sidelink communication, the feedback procedure can be efficiently performed, and the performance of the communication system can be improved.

DETAILED DESCRIPTION OF THE EMBODIMENTS

Figure 1:
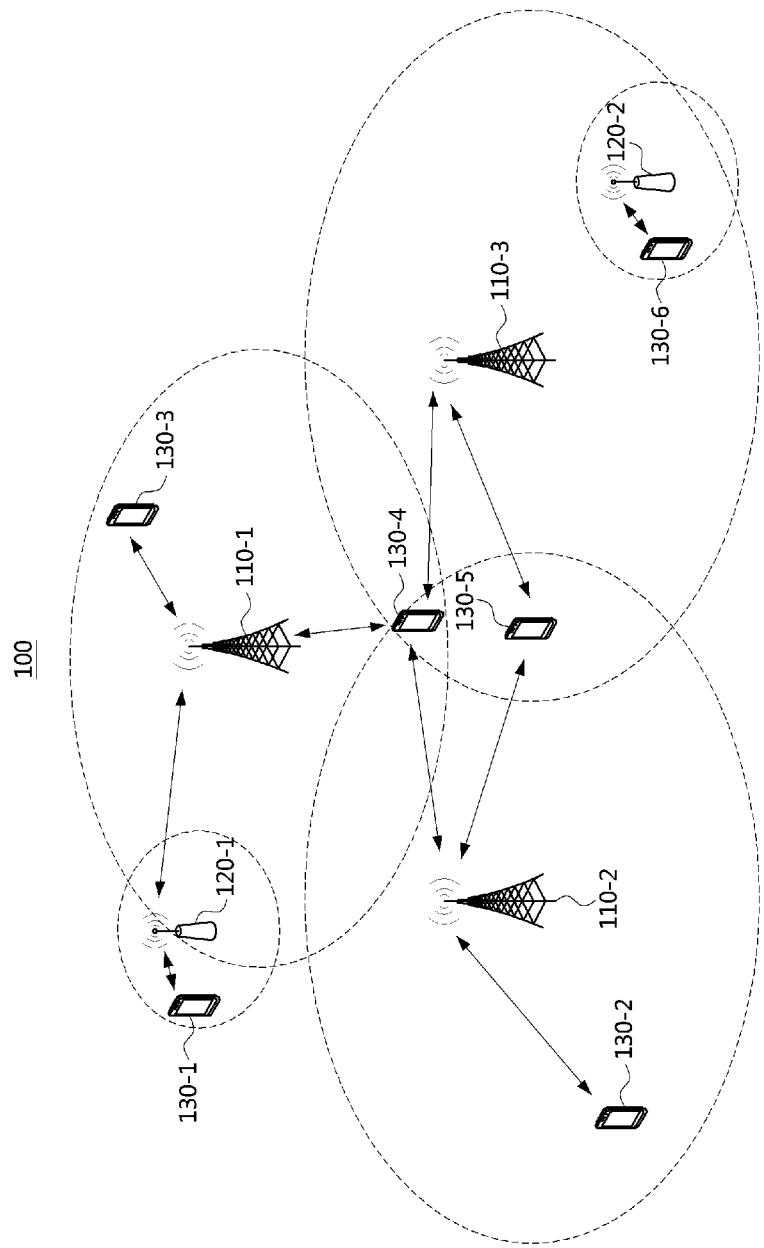
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
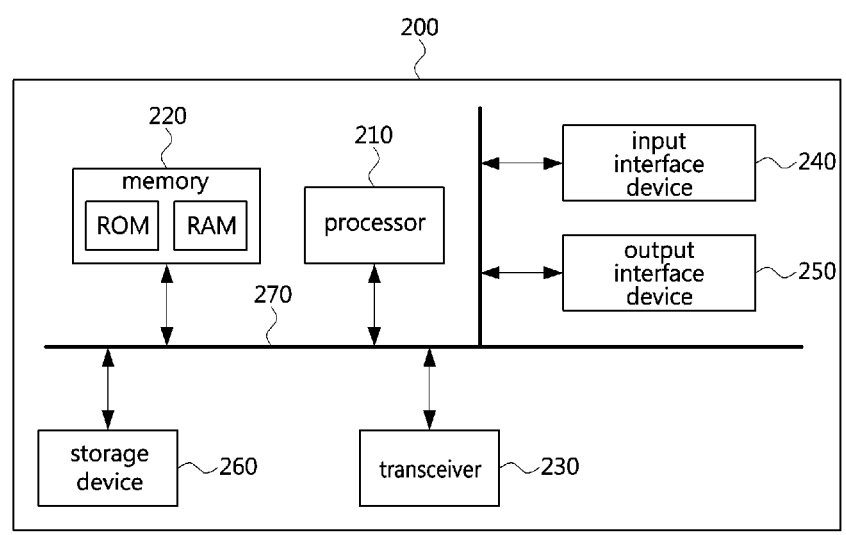
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 1304, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
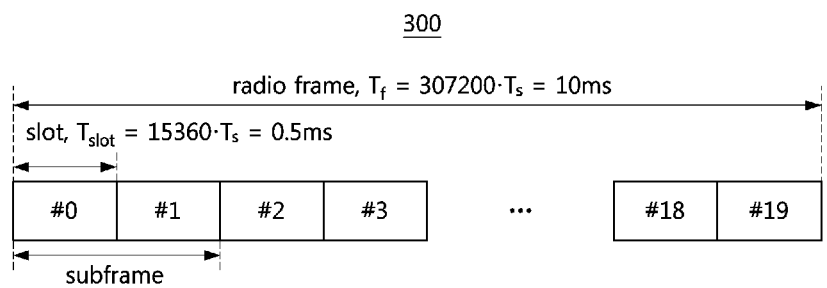
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length $T_f$ of the radio frame 300 may be 10 milliseconds (ms). The length of the subframe may be 1 ms, and the length $T_{slot}$ of a slot may be 0.5 ms. Here, $T_s$ may indicate a sampling time, and may be $1/30,720,000$ s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
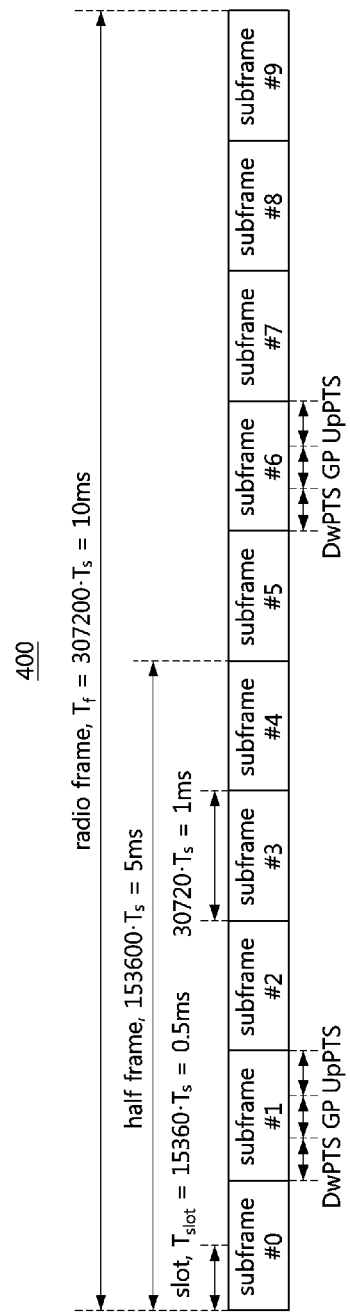
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes. Thus, the radio frame 400 may comprise 10 subframes. The length $T_f$ of the radio frame 400 may be 10 ms. The length of the half frame may be 5 ms. The length of the subframe may be 1 ms. Here, $T_s$ may be $1/30,720,000$ s.

The radio frame 400 may include at least one downlink subframe, at least one uplink subframe, and a least one special subframe. Each of the downlink subframe and the uplink subframe may include two slots. The length $T_{slot}$ of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A Gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the Gold sequence generated by being initialized by the cell ID. Thereafter, the Gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MLB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| Numerology ($\mu$) | 0 | 1 | 2 | 3 | 4 | 5 |
|---|---|---|---|---|---|---|
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |
| CP length [us] | 4.76 | 2.38 | 1.19 | 0.60 | 0.30 | 0.15 |
| Number of OFDM symbols within 1ms | 14 | 28 | 56 | 112 | 224 | 448 |

For example, the subcarrier spacing of the communication system may be set to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

Also, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 5:
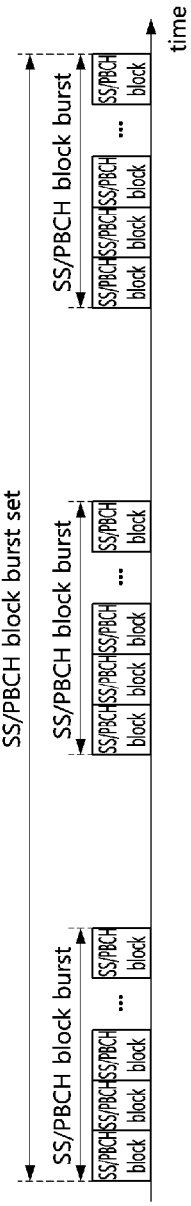
FIG. 5 is a conceptual diagram illustrating a first exemplary embodiment of a transmission method of SS/PBCH block in a communication system.

FIG. 5 is a conceptual diagram illustrating a first exemplary embodiment of a transmission method of SS/PBCH block in a communication system.

As shown in FIG. 5, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributedly. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 6:
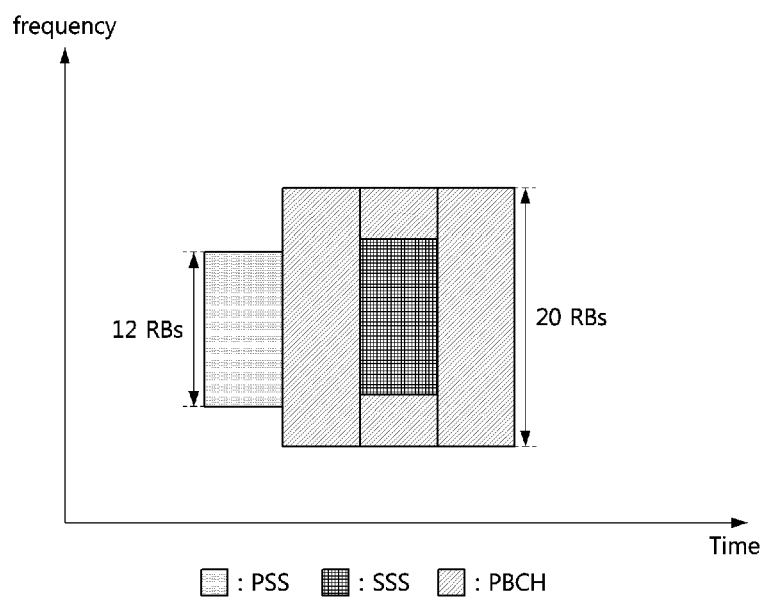
FIG. 6 is a conceptual diagram illustrating a first exemplary embodiment of an SS/PBCH block in a communication system.

FIG. 6 is a conceptual diagram illustrating a first exemplary embodiment of an SS/PBCH block in a communication system.

As shown in FIG. 6, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number L of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number L of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

Figure 7:
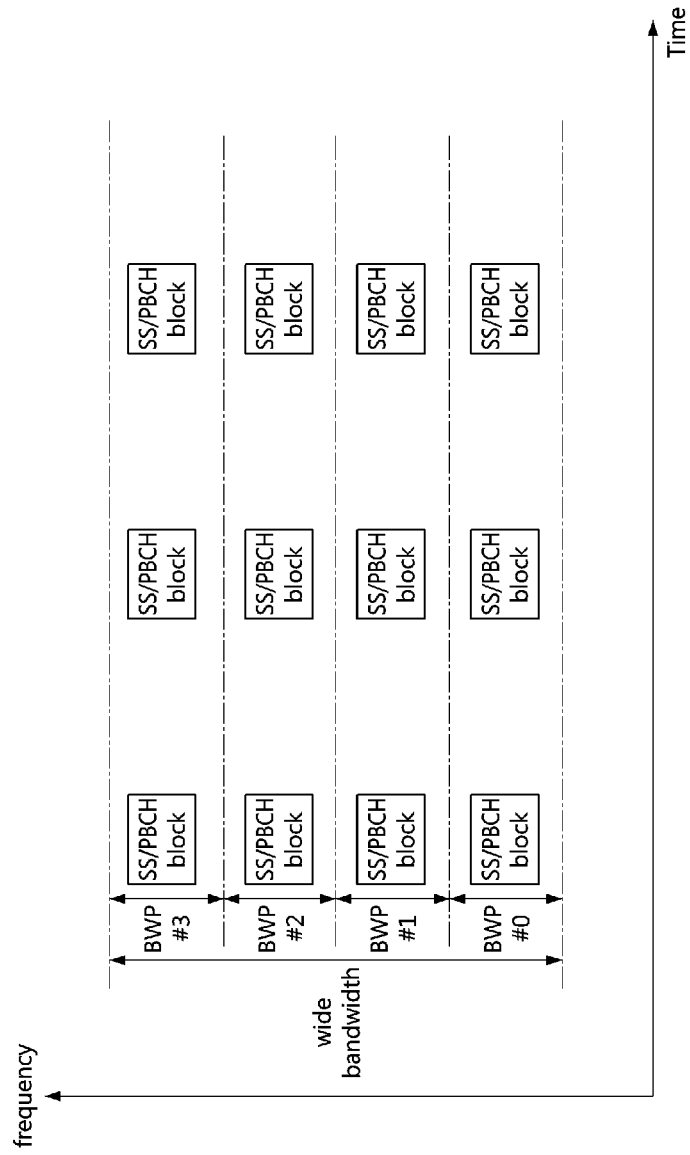
FIG. 7 is a conceptual diagram illustrating a second exemplary embodiment of a method of transmitting SS/PBCH blocks in a communication system.

FIG. 7 is a conceptual diagram illustrating a second exemplary embodiment of a method of transmitting SS/PBCH blocks in a communication system.

As shown in FIG. 7, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 8A:
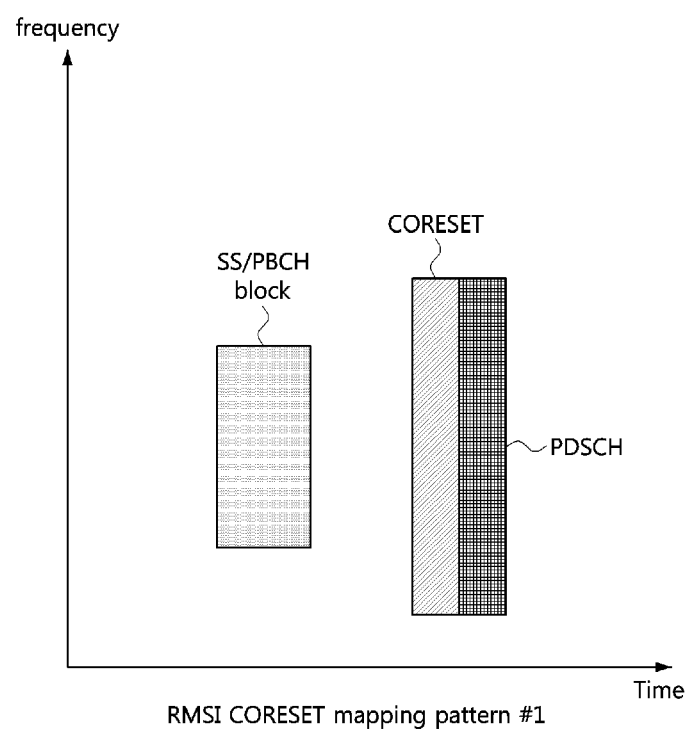
FIG. 8A is a conceptual diagram illustrating an RMSI CORESET mapping pattern #1 in a communication system.
Figure 8B:
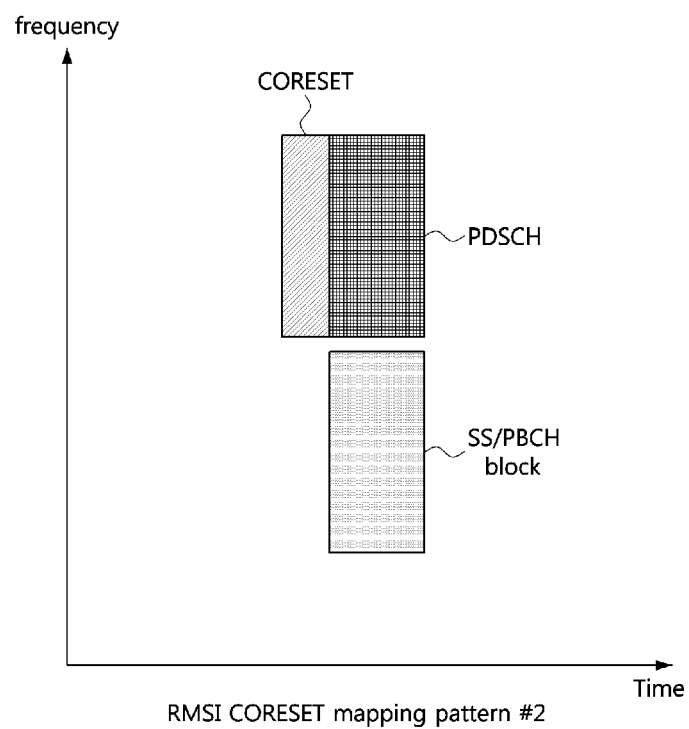
FIG. 8B is a conceptual diagram illustrating an RMSI CORESET mapping pattern #2 in a communication system.
Figure 8C:
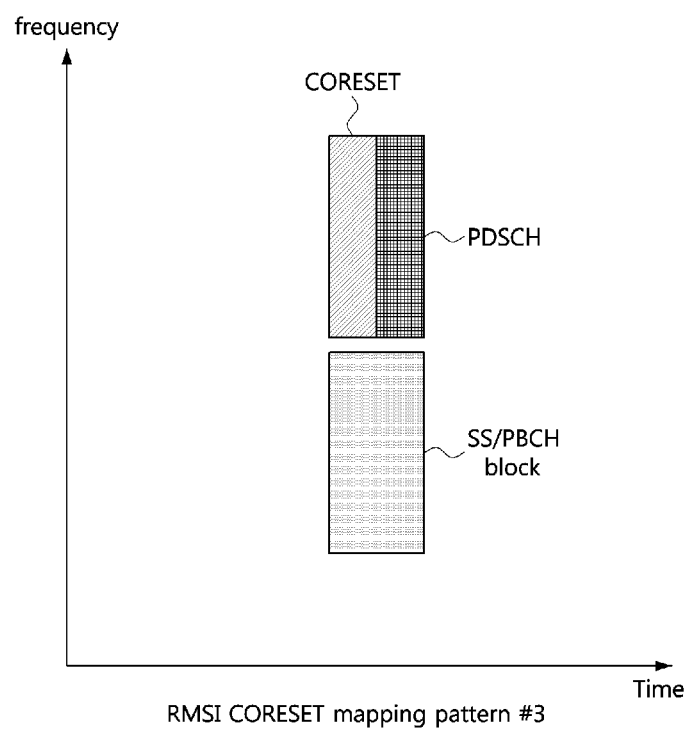
FIG. 8C is a conceptual diagram illustrating an RMSI CORESET mapping pattern #3 in a communication system.

FIG. 8A is a conceptual diagram illustrating an RMSI CORESET mapping pattern #1 in a communication system, FIG. 8B is a conceptual diagram illustrating an RMSI CORESET mapping pattern #2 in a communication system, and FIG. 8C is a conceptual diagram illustrating an RMSI CORESET mapping pattern #3 in a communication system.

As shown in FIGS. 8A to 8C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORESET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 2 below.

TABLE 2

| PDSCH type mapping | Normal CP | | | Extended CP | | |
|---|---|---|---|---|---|---|
| | S | L | S + L | S | L | S + L |
| Type A | {0,1,2,3} (Note 1) | {3, . . . ,14} | {3, . . . ,14} | {0,1,2,3} (Note 1) | {3, . . . ,12} | {3, . . . ,12} |
| Type B | {0, . . . ,12} | {2,4,7} | {2, . . . ,14} | {0, . . . ,10} | {2,4,6} | {2, . . . ,12} |

Note 1: S = 3 is applicable only if dmrs-TypeA-Position = 3 the SS/PBCH block, the CORESET (i.e., RMSI CORESET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI The type A (i.e., PDSCH mapping type A) may be slot-based transmission. When the type A is used, a position of a start symbol of a PDSCH may be set to one of {0, 1, 2, 3}. When the type A and a normal CP are used, the number of symbols constituting the PDSCH (e.g., the duration of the PDSCH) may be set to one of 3 to 14 within a range not exceeding a slot boundary. The type B (i.e., PDSCH mapping type B) may be non-slot-based transmission. When the type B is used, a position of a start symbol of a PDSCH may be set to one of 0 to 12. When the type B and the normal CP are used, the number of symbols constituting the PDSCH (e.g., the duration of the PDSCH) may be set to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g., when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, the first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 μs. When a subcarrier spacing of 15 kHz is used in the NR system, a time period (e.g., length) of one symbol (e.g., OFDM symbol) may be 66.7 μs. When a subcarrier spacing of 30 kHz is used in the NR system, a time period of one symbol (e.g., OFDM symbol) may be 33.3 μs. In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 9:
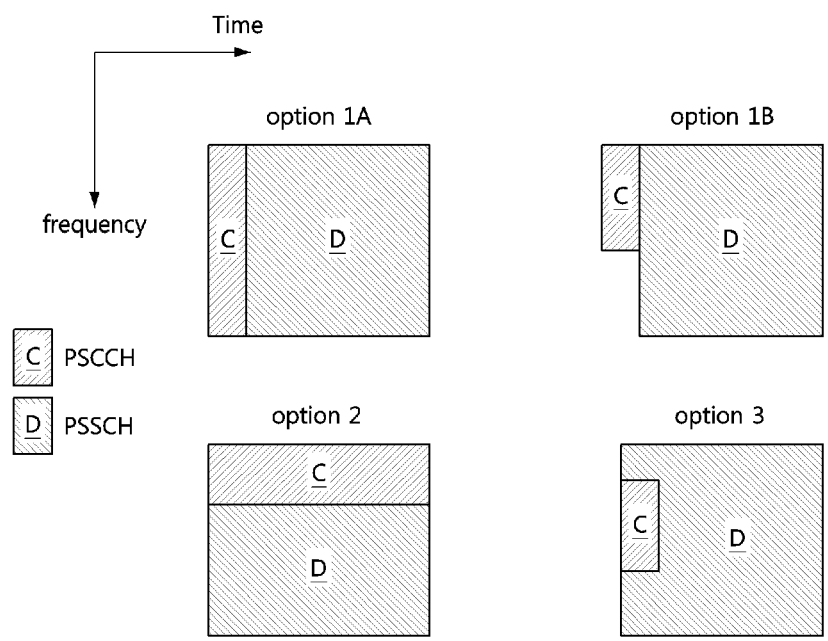
FIG. 9 is a conceptual diagram illustrating exemplary embodiments of a method for multiplexing a control channel and a data channel in sidelink communication.

FIG. 9 is a conceptual diagram illustrating exemplary embodiments of a method for multiplexing a control channel and a data channel in sidelink communication.

Referring to FIG. 9, sidelink communication may support an option 1A, an option 1B, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

Hereinafter, sidelink communication methods based on feedback in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

In the embodiments, "a resource region A (or resource pool A, transmission resource A) is configured independently from a resource region B (or resource pool B, transmission resource B)" may mean "a resource region A (or resource pool A, transmission resource A) is configured separately from a resource region B (or resource pool B, transmission resource B)".

[Feedback Resource Selection Method]

In the sidelink communication (e.g., NR-V2X sidelink communication), in order to improve reliability of data reception, the terminal (e.g., transmitting terminal) may retransmit data a preconfigured number of times according to a predetermined procedure, regardless of whether the data has been successfully received at the receiving terminal. In this case, a feedback indicating whether data reception is successful may not be transmitted.

In another exemplary embodiment, the receiving terminal may transmit a feedback (e.g., ACK or NACK) to the transmitting terminal according to whether data reception is successful, and the transmitting terminal may determine whether to retransmit the data based on the feedback. When the mode 1 is used and an uplink resource (e.g., PUCCH and/or PUSCH) for feedback is configured, the transmitting terminal may report a feedback (e.g., HARQ response, HARQ-ACK) received from the receiving terminal to the base station by using the corresponding uplink resource. The transmitting terminal may transmit the feedback of the receiving terminal to the base station as it is. Alternatively, the transmitting terminal may generate a feedback based on the feedback of the receiving terminal and transmit the generated feedback to the base station. The base station may receive the feedback of the receiving terminal from the transmitting terminal, and may allocate a new sidelink resource to the transmitting terminal based on the feedback. The transmitting terminal may retransmit the data to the receiving terminal by using the new sidelink resource. When the mode 1 is used and an uplink resource for feedback is not configured, the transmitting terminal may retransmit the data to the receiving terminal through a resource region pre-allocated by the base station.

When the mode 2 is used, the transmitting terminal may autonomously select a sidelink resource without intervention of the base station. In this case, the transmitting terminal may not transmit a feedback of the receiving terminal to the base station, and may determine whether to retransmit the data based on the feedback of the receiving terminal. The feedback transmission operation and the feedback monitoring operation may be clearly classified and performed in a point-to-point scheme between the receiving terminal and the transmitting terminal. In the sidelink communication, the transmitting terminal may autonomously select a sidelink resource and/or a receiving terminal without control of the base station, and may transmit data to the receiving terminal (e.g., the selected receiving terminal) by using the selected sidelink resource. Accordingly, a timing for feedback transmission and a timing for feedback reception may overlap in a specific terminal. One receiving terminal may simultaneously transmit feedbacks to a plurality of transmitting terminals. One receiving terminal may receive a plurality of data from one transmitting terminal, and may simultaneously transmit feedbacks for the plurality of data.

1-bit ACK/NACK information (e.g., feedback) may be transmitted in a sequence form through a physical sidelink feedback channel (PSFCH). A PSFCH candidate resource set may be configured according to the number of subchannels per slot and the number of PSSCH slots associated with a PSFCH slot. The PSFCH slot may be a slot in which PSFCH(s) are transmitted, and the PSSCH slot may be a slot in which PSSCH(s) are transmitted. For example, when $M_{PRB,set}^{PSFCH}$ RBs are configured as a PSFCH resource pool for PSFCH transmission, if the number of subchannels per slot (e.g., sidelink slot) is $N_{subch}$ and the number of PSSCH slots associated with a PSFCH slot is $N_{PSSCH}^{PSFCH}$, each PSFCH candidate resource (e.g., PSFCH candidate resource set) corresponding to the i-th slot and the j-th subchannel may be defined as $M_{subch,slot}^{PSFCH}$ slot RBs (i.e., [(i+j·$N_{PSSCH}^{PSFCH}$)·$M_{subch,slot}^{PSFCH}$, (i+1+j·$N_{PSSCH}^{PSFCH}$)·$M_{subch,slot}^{PSFCH}$−1] RBs) from $M_{PRB,set}^{PSFCH}$ RBs. Here, $M_{subch,slot}^{PSFCH}$ may be defined as $M_{PRB,set}^{PSFCH}$/($N_{subch}·N_{PSSCH}^{PSFCH}$).

The base station may configure $M_{PRB,set}^{PSFCH}$ RBs that are a multiple of $N_{subch}·N_{PSSCH}^{PSFCH}$ to the terminal. The number of PSFCH resources capable of HARQ ACK/NACK multiplexing may be $R_{PRB,CS}^{PSFCH}=N_{type}^{PSFCH}$, $M_{subch,slot}^{PSFCH}·N_{CS}^{PSFCH}·N_{CS}^{PSFCH}$ may be the number of cyclic shift pairs configured by the higher layer. $N_{CS}^{PSFCH}$ may be set to one of 1, 2, 3, and 6. When the number of cyclic shift pairs is set to 1, one HARQ response (e.g., ACK or NACK) may be multiplexed within one RB. When the number of cyclic shift pairs is set to 6, up to 6 HARQ responses (e.g., ACK or NACK) may be multiplexed within one RB.

The number of multiplexed HARQ responses may be determined according to $N_{type}^{PSFCH}$. When $N_{type}^{PSFCH}=1$ and a plurality of subchannels are used for PSSCH transmission, PSFCH transmission may be possible through $M_{subch,slot}^{PSFCH}$ RBs associated with the first subchannel among the plurality of subchannels. In case that $N_{type}^{PSFCH}=N_{subch}^{PSSCH}$, PSFCH transmission may be possible through $M_{subch,slot}^{PSFCH}$ slot RBs associated with the plurality of subchannels used for PSSCH transmission. In case that $N_{type}^{PSFCH}=N_{subch}^{PSSCH}$, the number of multiplexed HARQ responses may be $N_{subch}^{PSSCH}$ times the number of multiplexed HARQ responses when $N_{type}^{PSFCH}=1$.

$R_{PRB,CS}^{PSFCH}$ PSFCH resources may be first indexed according to an ascending order of the RB index from $N_{type}^{PSFCH}·M_{subch,slot}^{PSFCH}$ RBs, and then indexed according to an ascending order of the cyclic shift pair index from $N_{CS}^{PSFCH}$ cyclic shift pairs. The terminal may determine an index of a PSFCH resource in which a HARQ response is to be transmitted as $(P_{ID}+M_{ID})$ mod $R_{PRB,CS}^{PSFCH}$. In this case, $P_{ID}$ may be a physical layer source identifier (ID). $P_{ID}$ may be signaled through an SCI format 0-2. $M_{ID}$ may be configured according to a HARQ ACK/NACK feedback option. For example, $M_{ID}$ may be set to 0. Alternatively, $M_{ID}$ may be configured as a receiving terminal ID (e.g., member ID) by higher layer signaling (e.g., higher layer message).

When a groupcast feedback option 2 is used, all member terminals (e.g., all receiving terminals) within a group may report ACK/NACK information (e.g., HARQ ACK) for data to the transmitting terminal (e.g., groupcast transmitting terminal) through individual PSFCH resources. The groupcast feedback option 2 may be used when the transmitting terminal is aware of all the receiving terminals within the group, and an individual member ID may be configured for each of all the receiving terminals within the group.

When the groupcast feedback option 2 is used, a method of configuring a member ID to each of all receiving terminals within the group will be proposed. In groupcast communication, since all receiving terminals within the group receive the same PSCCH and PSSCH, it may be impossible to configure a member ID through an individual control channel and/or data channel for each receiving terminal. Accordingly, the member ID of each of the receiving terminals within the group may be configured through a MAC signaling (e.g., MAC control element (CE)) and/or a higher layer signaling (e.g., system information or RRC message).

When the groupcast feedback option 2 is used, the transmitting terminal may be aware of all the receiving terminals (e.g., all members) within the group, and the member ID may be associated with the terminal ID or terminal-specific ID of each of all the receiving terminals within the group. The member ID may be signaled based on the association between the member ID and the terminal ID or the association between the member ID and the terminal-specific ID. The member ID may be different from the terminal ID or the terminal-specific ID.

The terminal ID and/or the terminal-specific ID may be configured to have a preconfigured number of bits. The terminal ID and/or the terminal-specific ID may be configured for each terminal. In order to prevent collision of PSFCH resources within the group (e.g., groupcast group), when the number of all members in the group is K, each member ID may be set to one of '0, 1, . . . , K−1'. For example, when there are 4 members in the group (i.e., K=4), and the terminal IDs ($UE_{ID}$s) or terminal-specific IDs ($UE_{ID}$s) of the respective 4 members are A, B, C, and D, the transmitting terminal may configure {($UE_{ID}$=A, $M_{ID}$=0), ($UE_{ID}$=B, $M_{ID}$=1), ($UE_{ID}$=C, $M_{ID}$=2), ($UE_{ID}$=D, $M_{ID}$=3)} by associating the member IDs and the terminal IDs or by associating the member IDs and the terminal-specific IDs. The transmitting terminal may signal {($UE_{ID}$=A, $M_{ID}$=0), ($UE_{ID}$=B, $M_{ID}$=1), ($UE_{ID}$=C, $M_{ID}$=2), ($UE_{ID}$=D, $M_{ID}$=3)} to the respective members. Each member (e.g., each receiving terminal) may obtain the member ID associated with the terminal ID or the terminal-specific ID. Each member may select a PSFCH resource based on the member ID, and may feedback ACK/NACK information to the transmitting terminal using the selected PSFCH resource.

Alternatively, the member ID may be configured by the base station configuring the group instead of the transmitting terminal within the group. The base station may configure the group (e.g., groupcast group) consisting of the transmitting terminal and the receiving terminal(s) for groupcast communication. In the group configuration procedure, the base station may configure the member ID to each receiving terminal within the group. If each of the receiving terminals within the group has the terminal ID or the terminal-specific ID, the base station may configure the member ID associated with the terminal ID or the terminal-specific ID, and signal the association information (e.g., 'terminal ID—member ID' or 'terminal specific ID—member ID') to the receiving terminal.

If the receiving terminals within the group do not have the terminal IDs or the terminal-specific IDs, the base station may configure the terminal ID or the terminal-specific ID to each of the receiving terminals so that it can be used for configuring a PSFCH resource. The terminal ID or terminal-specific ID may be configured to include or indicate the member ID. Specifically, when the number of all members within the group is K, the member ID used for configuring the PSFCH resource may be set to one of the values '0, 1, . . . , K–1' in order to prevent collision between the PSFCH resources. Therefore, when some bit(s) of the terminal ID or the terminal-specific ID are used as the member ID, the corresponding bit(s) may be configured to represent the corresponding value among '0, 1, . . . , K–1'. Some bit(s) used as the member ID may be configured as a part of most significant bits (MSBs) or a part of least significant bits (LSBs) of the terminal ID or terminal-specific ID.

Alternatively, the terminal ID or the terminal-specific ID may be configured so that a result of a modulo operation for the terminal ID or terminal-specific ID and K (e.g., the number of all members within the group) is the corresponding value among '0, 1, . . . , K–1'. For example, when there are 4 members within the group (i.e., K=4), and the terminal IDs or terminal-specific IDs of the respective members are A, B, C, and D, the terminal may configure the terminal IDs and the terminal-specific IDs so that the results of the modulo operations for the terminal IDs or terminal-specific IDs and K are {A mod 4=0, B mod 4=1, C mod 4=2, D mod 4=3}.

The terminal may transmit a HARQ response based on an RB and a cyclic shift pair corresponding to a PSFCH resource index. When the HARQ response is NACK, the terminal may transmit a sequence to which the determined cyclic shift pair is applied through the determined RB. When the HARQ response is ACK, the terminal may transmit a sequence to which 'the determined cyclic shift pair+6' is applied through the determined RB. In exemplary embodiments, methods of determining the location of the RB through which the HARQ response is transmitted and determining the index of the cyclic shift pair from the PSFCH resource index will be described.

When a PSFCH resource index is X, the terminal may determine a PSFCH resource based on $X=(P_{ID}+M_{ID}) \bmod R_{PRB,CS}^{PSFCH}$. When an RB index within the PSFCH candidate resource consisting of $N_{subch}^{PSSCH} \cdot M_{subch,slot}^{PSFCH}$ RBs associated with subchannel(s) of the PSSCH through which data is transmitted is Y ($Y=0, 1, \ldots, N_{subch}^{PSSCH} \cdot M_{subch,slot}^{PSFCH}-1$), $Y=X \bmod (N_{type}^{PSFCH} \cdot M_{subch,slot}^{PSFCH})$ may be defined. The location of the corresponding RB within $M_{PRB,set}^{PSFCH}$ RBs may be $(i+j \cdot N_{PSSCH}^{PSFCH}) \cdot M_{subch,slot}^{PSFCH}+X \bmod (N_{type}^{PSFCH} \cdot M_{subch,slot}^{PSFCH})$. If an index of a cyclic shift pair for the RB is C, $C=\lfloor X/(N_{type}^{PSFCH} \cdot M_{subch,slot}^{PSFCH}) \rfloor$ may be defined. When the PSFCH resource index X, the RB index Y, and the index C of the cyclic shift pair are not defined, the location of the RB may be defined based on Equation 1 below, and the value (e.g., index) of the cyclic shift pair may be defined based on Equation 2 below.

$$(i+j \cdot_{PSSCH}^{PSFCH}) \cdot M_{subch,slot}^{PSFCH} + ((P_{ID}+M_{ID}) \bmod R_{PRB,CS}^{PSFCH}) \bmod (N_{type}^{PSFCH} \cdot M_{subch,slot}^{PSFCH}) \quad \text{[Equation 1]}$$

$$\lfloor (P_{ID}+M_{ID}) \bmod R_{PRB,CS}^{PSFCH} / (N_{type}^{PSFCH} \cdot M_{subch,slot}^{PSFCH}) \rfloor \quad \text{[Equation 2]}$$

[Feedback Resource Allocation Method]

Code Block Group (CBG)-based transmission may be used for efficiency of transmission resources. In the Transport Block (TB)-based transmission scheme of the LTE system, one TB may be composed of a plurality of Code Blocks (CBs) according to a channel coding size limitation, and a HARQ response for one TB instead of the plurality of CBs may be transmitted. In the case where one TB is composed of a plurality of CBs in the NR system, the plurality of CBs may be configured as a plurality of groups (e.g., CBGs), and a HARQ response for one group may be transmitted. Each group may comprise one or more CBs.

When the TB-based transmission scheme is used, the receiving terminal may transmit a HARQ response for the entire TB instead of each CB constituting the received TB. That is, one HARQ response may be transmitted per TB. When the HARQ response is NACK, a retransmission procedure for the entire TB including the plurality of CBs may be performed.

When the CBG-based transmission scheme is used, the receiving terminal may transmit a HARQ response for each CBG constituting the received TB (e.g., data). The number of HARQ responses may be the same as the number of CBGs included in the corresponding TB. One CBG may comprise one or more CBs. When NACK(s) for a portion of the plurality of CBGs constituting the data are received, the base station may perform a retransmission procedure for the portion of the plurality of CBGs. When the CBG-based transmission scheme is used, transmission resources may be efficiently used.

The CBG-based transmission scheme may be efficiently used even when a portion of data is pre-empted due to transmission of high-priority data and/or when a portion of data cannot be transmitted due to a listen-before-talk (LBT) procedure in the NR-U system. In the sidelink communication (e.g., NR-V2X sidelink communication), not only the TB-based transmission scheme but also the CBG-based transmission scheme may be used.

In order to support the CBG-based transmission scheme, it may be necessary to improve the PSFCH through which the HARQ response (e.g., ACK/NACK feedback information) is transmitted. For example, the PSFCH needs to be improved so that a HARQ response for each of a plurality of CBGs constituting a TB can be transmitted. PSFCH transmission methods, for transmitting a plurality of HARQ responses at the same time, will be proposed. In order to simultaneously transmit a plurality of HARQ responses, a plurality of PSFCHs may be used.

When simultaneous transmission of multiple HARQ responses for TBs received from multiple terminals is required or when simultaneous transmission of multiple HARQ responses for multiple TBs received from one terminal is required, multiple PSFCHs may be used. The maximum number of transmittable PSFCHs (i.e., $N_{PSFCH}$) may be configured by system information, UE-specific RRC signaling and/or control information. The maximum number of transmittable PSFCHs in consideration of a transmission power of the terminal may be defined as $M_{PSFCH}$. In this case, the maximum number of transmittable PSFCHs may be a result of $\min(M_{PSFCH}, N_{PSFCH})$. HARQ responses for $\min(M_{PSFCH}, N_{PSFCH})$ TBs having high priority among a plurality of TBs may be transmitted through PSFCHs.

In order to support the CBG-based transmission scheme, an index of each of the plurality of CBGs in the TB may be additionally applied to the above-described PSFCH resource index. In this case, the terminal may use the maximum number N of CBGs per TB configured by higher layer signaling and the number C of CBs calculated based on the size of the TB (e.g., TB to be actually transmitted) to calculate the number M of CBGs. For example, the terminal may calculate the number of actual CBGs based on M=min (N, C). The terminal may select a PSFCH resource for transmission of a HARQ response for each CBG by adding a CBG index (e.g., 1, . . . , M−1) based on the number M of CBGs to the PSFCH resource index.

Here, the PSFCH resource may be implicitly selected. Specifically, when the PSFCH resource index is X, the terminal may calculate the PSFCH resource index using $X=(P_{ID}+M_{ID}+C_{index}) \bmod R_{PRB,CS}^{PSFCH}$, and may transmit the HARQ response by using the PSFCH resource corresponding to the PSFCH resource index. Here, $C_{index}$ may be a CBG index (0, . . . , M−1).

In the procedure of simultaneously transmitting HARQ responses for the plurality of CBGs of each of the plurality of TBs, only $\min(M_{PSFCH}, N_{PSFCH})$ PSFCHs (e.g., HARQ responses) may be simultaneously transmitted. The terminal may select TBs having high priority among the plurality of TBs based on priority of data signaled through an SCI format 0-1 (e.g., SCI format 1-A that is a 1 stage SCI), and select $\min(M_{PSFCH}, N_{PSFCH})$ CBGs according to an ascending order of the index among the CBGs included in the selected TBs. The terminal may transmit a HARQ response for each of the selected CBGs through a PSFCH.

For example, transmission of HARQ responses for two TBs (e.g., TB #0, TB #1) may be required, a priority of the TB #1 may be higher than that of the TB #0, and each of the TBs may include two CBGs (e.g., CBG #0, CBG #1). When the maximum number of transmittable PSFCHs (e.g., HARQ responses) is 3, the terminal may transmit a HARQ response for each of the CBG #0 and CBG #1 included in the TB #1 having a high priority and a HARQ response for the CBG #0 included in the TB #0 through the PSFCHs. That is, the terminal may transmit three HARQ responses through the PSFCHs.

For another example, transmission of HARQ responses for two TBs (e.g., TB #0, TB #1) may be required, a priority of the TB #0 may be higher than that of the TB #1, and each of the TBs may include four CBGs (e.g., CBG #0, CBG #1, CBG #2, CBG #3). When the maximum number of transmittable PSFCHs (e.g., HARQ responses) is 3, the terminal may transmit a HARQ response for each of the CBG #0, the CBG #1, and the CBG #2 included in the TB #0 having a high priority through PSFCHs. That is, the terminal may transmit three HARQ responses through the PSFCHs.

When determining the priority between the CBGs included in the same TB, the CBG priority may be determined based on the HARQ response (e.g., ACK/NACK information) instead of the ascending order of the CBG index. Alternatively, in order to determine the CBG priority, the CBG index and the HARQ response may be used together. Specifically, a priority of ACK may be higher than that of NACK.

In case that ACK is transmitted, since a retransmission procedure for a CBG associated with the ACK is not performed, efficiency of resource usage may be improved. On the other hand, in case that NACK is transmitted, a retransmission procedure for a CBG associated with the NACK may be performed. In case that NACK is not transmitted, the transmitting terminal may not receive the HARQ response, and thus may perform a retransmission procedure for the corresponding CBG. In both the case when NACK is successfully transmitted and the case when NACK is not transmitted, a retransmission procedure for the CBG may be performed. That is, setting the priority of NACK higher than the priority of ACK may not help to improve the efficiency of resource usage. Therefore, in the case of determining the priority between CBGs within the same TB, the terminal may determine that the priority of the CBG (e.g., successfully received CBG) associated with the ACK is higher than that of the CBG (e.g., CBG whose reception fails) associated with the NACK.

For example, transmission of HARQ responses for two TBs (e.g., TB #0, TB #1) may be required, a priority of the TB #1 may be higher than that of the TB #0, each of the TBs may include two CBGs (e.g., CBG #0, CBG #1), reception of the CBG #0 included in the TB #0 may fail, and reception of the CBG #1 included in the TB #0 may be successful. When the maximum number of transmittable PSFCHs (e.g., HARQ responses) is 3, the terminal may transmit a HARQ response for each of the CBG #0 and the CBG #1 included in the TB #1 having the high priority and transmit a HARQ response for the CBG #1 (e.g., successfully-received CBG) included in the TB #0 through the PSFCHs. That is, the terminal may transmit three HARQ responses through the PSFCHs.

When reception of all CBGs included in the same TB is successful or when reception of all CBGs included in the same TB fails, the terminal may not be able to select CBG(s) according to the priority of ACK/NACK. In this case, the terminal may select the CBG(s) according to an ascending order of the CBG index. Alternatively, the terminal may arbitrarily select the CBG(s).

Alternatively, the number of CBGs may be limited to the maximum number of transmittable PSFCHs (e.g., the number of PSFCHs that can be simultaneously transmitted). When the CBG-based transmission scheme is used, the terminal may use the maximum number N of CBGs per TB configured by higher layer signaling and the number C of CBs calculated based on the TB size to calculate the number M of CBGs (e.g., M=min(N, C)). Here, N may be configured as the maximum number of transmittable PSFCHs (e.g., the maximum number of PSFCHs that can be simultaneously transmitted).

As another method for transmitting a plurality of HARQ responses for a plurality of CBGs, a new PSFCH format (hereinafter referred to as 'PSFCH format 1') capable of transmitting a plurality of HARQ responses (or one or more HARQ responses) may be defined. The PSFCH format 1 may be similar to the NR PUCCH format 2. The terminal may perform a channel coding operation and a modulation operation for a plurality of HARQ responses for a plurality of CBGs, and may transmit a result of the above-described operations through the PSFCH format 1. A transmission resource of the PSFCH format 1 may be the same as the transmission resource of the existing PSFCH (hereinafter referred to as 'PSFCH format 0'). That is, the PSFCH format 1 and the PSFCH format 0 may share the same resource region. Alternatively, the transmission resource of the PSFCH format 1 may be configured independently from the transmission resource of the PSFCH format 0. In this case, the transmission resource of the PSFCH format 1 may not overlap with the transmission resource of the PSFCH format 0.

When the PSFCH format 1 and the PSFCH format 0 share the same resource region, the transmission resource of the PSFCH format 1 may be allocated (e.g., indicated) in the same manner as the PSFCH format 0. For example, the PSFCH format 1 may be implicitly allocated (e.g., indicated) based on the index of the PSCCH slot, the index of the PSSCH slot, and/or the subchannel index. In this case, a TX ID and/or RX ID used for configuring the transmission resource of the PSFCH format 0 may not be applied.

When the resource of the PSFCH format 1 is indicated by the slot index and/or the subchannel index used for data transmission, the PSFCH format 1 may be configured in a form similar to the PUCCH format 2. For example, the terminal may perform a channel coding operation and a modulation operation for HARQ responses, and map a result of the above-described operations and a reference signal (e.g., PSFCH RS, PSFCH DMRS) to the resource of the PSFCH format 1. The number of RBs for the PSFCH format 1 may be fixed in advance to a specific value. Alternatively, the number of RBs for the PSFCH format 1 may be configured by higher layer signaling (e.g., system information, RRC message), MAC signaling (e.g., MAC CE), and/or PHY signaling (e.g., SCI).

For multiplexing of the PSFCH format 1 and the PSFCH format 0, the PSFCH format 1 may be configured as $M_{subch,slot}^{PSFCH}$ RBs associated with the first subchannel used for PSCCH transmission when $N_{type}^{PSFCH}=1$. In the case that $N_{type}^{PSFCH}=N_{subch}^{PSSCH}$, $N_{subch}^{PSSCH} \cdot M_{subch,slot}^{PSFCH}$ RBs, which is a product of $N_{subch}^{PSSCH}$ subchannels used for PSSCH transmission and $M_{subch,slot}^{PSFCH}$ RBs corresponding to each subchannel, may be configured.

When the resource region of the PSFCH format 0 and the resource region of the PSFCH format 1 are configured differently, the resource of the PSFCH format 1 may be indicated by a $1^{st}$ stage SCI and/or a $2^{nd}$ stage SCI. The resource of the PSFCH format 1 may be allocated in advance by higher layer signaling (e.g., system information, RRC signaling). Candidate resources of the PSFCH format 1 may be configured by higher layer signaling, and the $1^{st}$ stage SCI and/or the $2^{nd}$ stage SCI may indicate one resource for the PSFCH format 1 among the candidate resources of the PSFCH format 1.

Alternatively, the resource of the PSFCH format 1 may be implicitly allocated (e.g., indicated) in a separate resource region by the slot index and/or the subchannel index used for data transmission. That is, the resource of the PSFCH format 1 may be allocated in the same or similar manner as the PSFCH format 0. Even when the PSFCH format 1 is transmitted in a separate resource region, the structure and/or number of RBs of the corresponding PSFCH format 1 may be identical to the structure and/or the number of RBs of the PSFCH format 1 when the PSFCH formats 0 and 1 share the same resource region.

Figure 10A:
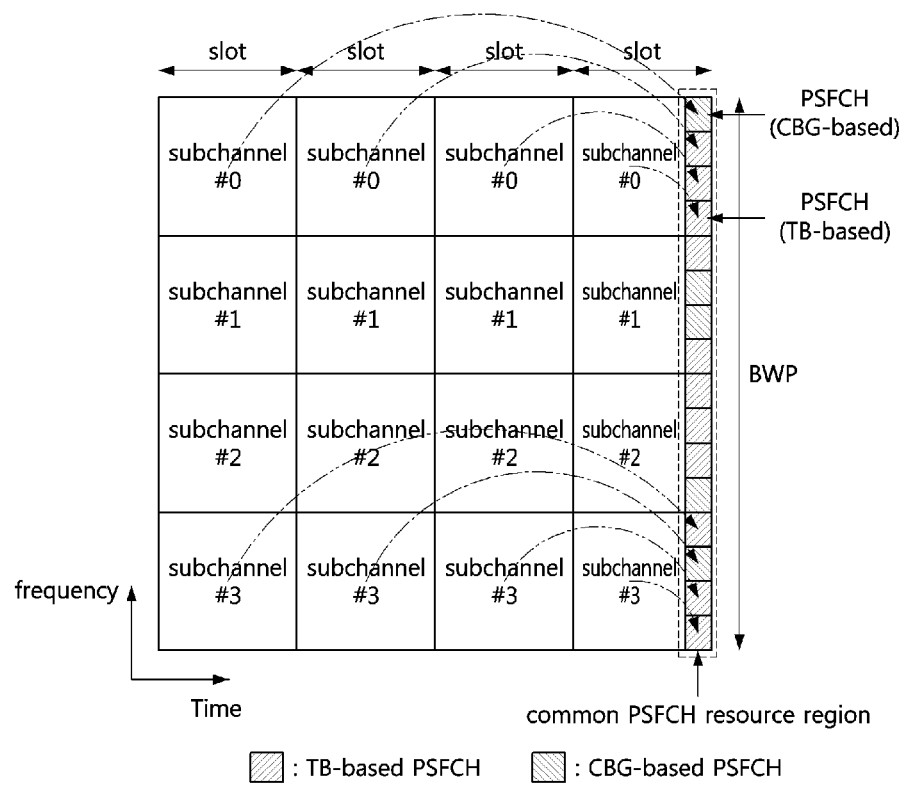
FIG. 10A is a conceptual diagram illustrating a first exemplary embodiment of a method for allocating a PSFCH resource.
Figure 10B:
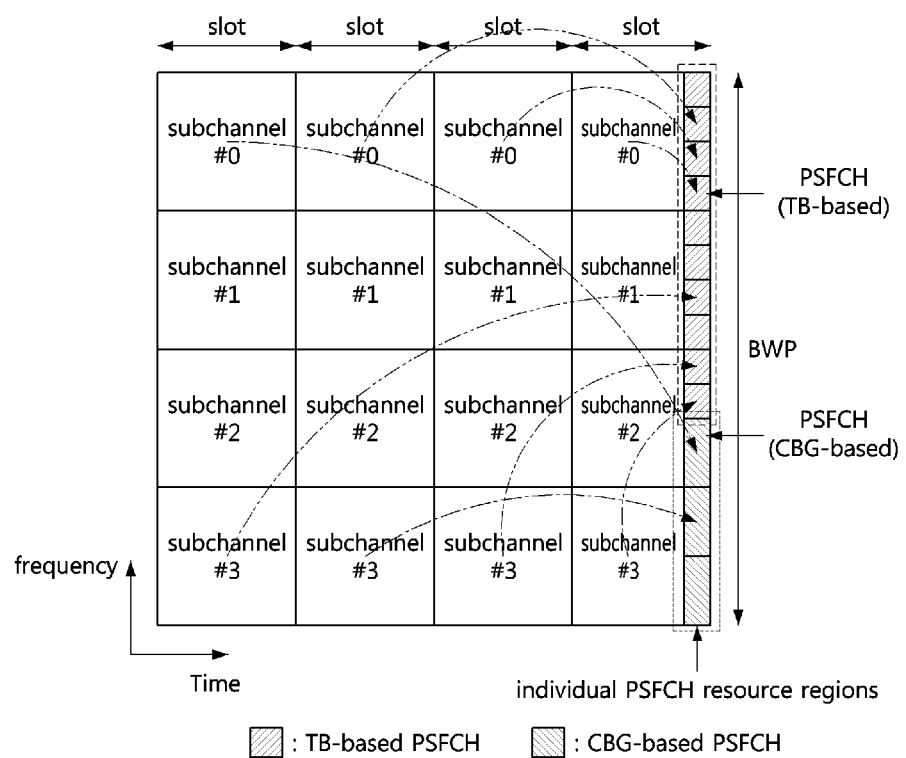
FIG. 10B is a conceptual diagram illustrating a second exemplary embodiment of a method for allocating a PSFCH resource.

FIG. 10A is a conceptual diagram illustrating a first exemplary embodiment of a method for allocating a PSFCH resource, and FIG. 10B is a conceptual diagram illustrating a second exemplary embodiment of a method for allocating a PSFCH resource.

In the exemplary embodiment shown in FIG. 10A, a common resource region for the PSFCH format 0 and the PSFCH format 1 may be configured, and a resource of each of the PSFCH format 0 and the PSFCH format 1 may be allocated (e.g., indicated) by an implicit scheme. In the exemplary embodiment shown in FIG. 10B, a resource region for the PSFCH format 0 and a resource region for the PSFCH format 1 may be independently configured. A separate PSFCH resource region may be configured. That is, the resource region for the PSFCH format 0 may be different from the resource region for the PSFCH format 1. The resource of the PSFCH format 1 may be explicitly configured (e.g., allocated or indicated) by at least one of RRC message and SCI.

When the PSFCH formats 0 and 1 exist, a method for selecting a PSFCH format (e.g., PSFCH format 0 or 1) to be transmitted by the terminal may be required. For example, the terminal supporting the CBG-based transmission scheme may transmit an implicitly indicated PSFCH format 1. Alternatively, an indicator included in the SCI (e.g., $1^{st}$ stage SCI and/or $2^{nd}$ stage SCI) may indicate the PSFCH format (e.g., PSFCH format 0 or 1) used by the terminal. Alternatively, the terminal may select the PSFCH format 1 according to a method of indicating one resource for the PSFCH format 1 through an indicator included in the SCI (e.g., $1^{st}$ stage SCI and/or $2^{nd}$ stage SCI). In this case, when there is no corresponding indicator in the SCI or when the corresponding indicator indicates a specific value, the terminal may select the PSFCH format 0. Alternatively, a threshold value, which is a criterion for selecting the PSFCH format, may be preconfigured, and the terminal may use the PSFCH format 1 when the number of HARQ responses exceeds the threshold value, and may use the PSFCH format 0 when the number of HARQ responses is equal to or less than the threshold value. The above-described threshold value may be indicated by at least one of higher layer signaling, MAC signaling, and PHY signaling.

When the CBG-based transmission scheme is used, the PSFCH format 1 may include a HARQ response for a CBG that has been successfully received in a previous transmission procedure, and the corresponding HARQ response may be set as ACK. If a portion of CBGs have been successfully received in the previous transmission procedure, a retransmission procedure for the remaining CBGs may be performed. Even when HARQ responses for remaining CBGs excluding CBGs that have been successfully received are transmitted in the retransmission procedure, the corresponding HARQ responses may include HARQ responses for all CBGs. Accordingly, ambiguity for the HARQ responses may be resolved, and the transmission complexity of the HARQ responses may be reduced.

When HARQ responses for CBGs of each of a plurality of TBs are simultaneously transmitted, one PSFCH format 1 may be transmitted by multiplexing the HARQ responses. The HARQ responses for CBGs of a TB having a high priority may be preferentially mapped to the resource of the PSFCH format 1. That is, the HARQ responses for the CBG of the TB having a high priority may be preferentially transmitted through the PSFCH format 1. Here, the PSFCH resource (e.g., the resource of the PSFCH format 1) may correspond to a TB having the highest priority among the TBs. When the priorities between the TBs are the same, the TBs may be mapped to the PSFCH according to an ascending order of the transmission resource index. For example, if the index of the resource through which the TB #0 is transmitted is 0 and the index of the resource through which the TB #1 is transmitted is 1, the TB #0 may be mapped to the PSFCH first, and then the TB #1 may be mapped to the PSFCH.

The index of the transmission resource of the TB may be a resource pool index, a subchannel index, or a slot index. Alternatively, other parameter(s) used for PSCCH and/or PSSCH transmission may be used to determine the priorities of the TBs. Alternatively, among the TBs, the HARQ responses for the TB having the largest size or the TB having the smallest size may be transmitted through the PSFCH resource. When HARQ responses for CBGs of each of a plurality of TBs are restrictedly transmitted, HARQ responses between the TBs may not be multiplexed. In this case, the PSFCH format 1 may be transmitted through the PSFCH resource corresponding to each TB. Accordingly, a plurality of PSFCH format 1(s) may be transmitted. The number of transmittable PSFCH format 1(s) may be limited due to reasons such as limitation of the transmission power of the terminal. In this case, the PSFCH format 1 corresponding to a TB having a high priority may be preferentially transmitted. When the TBs have the same priority, a limited number of PSFCH format 1(s) may be transmitted by sequentially applying the above-described criteria.

As another method for transmitting a plurality of HARQ responses for a plurality of CBGs, one of various combinations for the plurality of HARQ responses may be selected, and one selected combination may be transmitted through the PSFCH. That is, a channel selection scheme may be applied. The combinations of the plurality of HARQ responses for the plurality of CBGs may be mapped one-to-one with combinations of a plurality of PSFCH resources and PSFCH cyclic shift values corresponding to the plurality of CBGs. When a PSFCH having a specific cyclic shift value is received in a specific PSFCH resource, a combination of the plurality of HARQ responses mapped to the specific PSFCH resource and the specific cyclic shift value may be identified according to the above-described mapping relationship.

For example, the TB may include 4 CBGs (e.g., CBG #0, CBG #1, CBG #2, CBG #3), the HARQ response for the CBG #0 may be ACK, and the HARQ responses for the CBG #1, CBG #2, and CBG #3 may be NACK. In this case, the terminal may transmit a PSFCH (e.g., HARQ response) having a cyclic shift value=0 in a PSFCH resource corresponding to the CBG #0. Alternatively, the HARQ response for each of the CBG #0 and the CBG #1 may be ACK, and the HARQ response for each of the CBG #2 and the CBG #3 may be NACK. The terminal may transmit a PSFCH (e.g., HARQ response) having a cyclic shift value=6 in a PSFCH resource corresponding to the CBG #0.

That is, the combinations of the HARQ responses may be configured as many as the number of the combinations of PSFCH resources and cyclic shift values. Since a specific PSFCH resource and a specific cyclic shift value are used according to a combination of the HARQ responses for the CBGs, transmission efficiency of the PSFCH may be improved. When HARQ responses for CBGs of each of a plurality of TBs are transmitted, one PSFCH may be transmitted for each TB. Therefore, HARQ responses for CBGs of many TBs may be transmitted. When one PSFCH resource includes a plurality of RBs, not only the PSFCH resource and cyclic shift value but also the plurality of RBs are additionally considered, so that the number of available combinations may increase.

[Resource Allocation Method for Feedback-Based Sidelink Transmission]

Resource allocation in the sidelink communication (e.g., NR-V2X sidelink communication) may be performed according to the mode 1 or the mode 2. When the mode 1 is used, the base station may allocate sidelink resource(s) for data transmission to the transmitting terminal within a preconfigured resource pool, and the transmitting terminal may transmit data to the receiving terminal by using the sidelink resource(s) allocated by the base station. When the mode 2 is used, the transmitting terminal may autonomously select sidelink resource(s) by performing a resource sensing operation and/or a resource selection operation within a preconfigured resource pool, and transmit data to the receiving terminal using the selected sidelink resource(s).

When transmitting scheduling information for resource(s) allocated in the mode 1 and the mode 2, not only scheduling information for current data but also scheduling information for retransmission data (or initial transmission data for another TB) may be transmitted together. Time and frequency locations may be arbitrarily selected in resource scheduling information for current data and resource scheduling information for subsequent retransmission data. However, the size of the subchannel within the slot may not be changed.

In case that the TB-based transmission scheme is used, if a NACK occurs for an initially-transmitted TB, a retransmission procedure for the TB may be performed. In this case, since the TB having the same size is retransmitted, there is no need to change the size of the subchannel. In case that the CBG-based transmission scheme is used, if a NACK occurs for a portion of CBGs included in an initially-transmitted TB, a retransmission procedure for the portion of the CBGs may be performed. In this case, since only the portion of the CBGs in the TB are retransmitted, the size of the subchannel required for the retransmission procedure may be smaller than the size of the subchannel required for the previous initial transmission procedure. Methods of allocating retransmission resources, for a case that the CBG-based transmission scheme is used and the scheduling information for initial transmission and the scheduling information for retransmission are configured together, will be described.

When the mode 2 is used, the transmitting terminal may select a transmission resource of data. Therefore, the transmitting terminal may select subchannel(s) for retransmission CBGs (e.g., subchannels having a smaller size, a smaller number of subchannels) by performing a resource (re)sensing operation and/or a resource (re)selection operation based on a HARQ response, and retransmit the retransmission CBGs through the selected subchannel(s). In this case, the locations of time and/or frequency resource for the retransmission may be changeable. When the mode 1 is used, the transmitting terminal may report the HARQ response of the receiving terminal to the base station before retransmission of the CBGs. In this case, the base station may allocate retransmission resources for the CBGs to the transmitting terminal based on the HARQ response of the receiving terminal, and the transmitting terminal may retransmit the CBGs to the receiving terminal using the retransmission resource allocated by the base station.

However, when the mode 1 is used, retransmission of a portion of the CBGs may be required before reporting the HARQ response of the receiving terminal to the base station. In this case, the transmitting terminal may retransmit a portion of the CBGs using a resource pre-allocated by the base station. In particular, methods of efficiently using the resource pre-allocated by the base station for retransmission of a portion of the CBGs will be described.

When the mode 1 is used, the transmitting terminal may not be able to arbitrarily change the resource pre-allocated by the base station. In this case, the transmitting terminal may change the existing MCS (e.g., MCS index, MCS level) to a new MCS for retransmission of a portion of the CBGs, and use the new MCS to retransmit the portion of the CBGs through the entire subchannel(s) allocated by the base station. Here, the MCS may be changed so that the portion of the CBGs may occupy the entire subchannel(s). For example, a modulation order of the new MCS (e.g., changed MCS) may be lower than that of the existing MCS, and a coding rate of the new MCS may be lower than that of the existing MCS. When the above-described scheme is used, the resource allocated by the base station may be used as it is, and since a low MCS is used, a probability of successful reception of the CBGs may be improved. Since a Channel Busy Ratio (CBR) decreases when a low MCS is used, the efficiency of using resources may be improved. Information on the changed MCS may be signaled through control information (e.g., SCI) for the retransmission CBGs.

Alternatively, the transmitting terminal may retransmit a portion of the CBGs by using a portion of the pre-allocated retransmission resources. The portion of resources used for the retransmission may be configured according to a pre-configured rule within pre-allocated retransmission resources. Specifically, the transmitting terminal may select resources according to an ascending order of the subchannel index, and may perform the retransmission using the selected resources. A PSCCH (e.g., 1' stage SCI) may be transmitted through subchannel(s) having the lowest index among the pre-allocated resources. Therefore, in order to facilitate monitoring of the PSCCH, the method of selecting resources according to an ascending order of the subchannel index may be appropriate.

Alternatively, the transmitting terminal may select resources according to a descending order of the subchannel index, and may perform the retransmission using the selected resources. The resource selection scheme (e.g., ascending or descending order of subchannel indexes) may be configured (e.g., indicated) by higher layer signaling, MAC signaling, and/or PHY signaling.

Alternatively, the transmitting terminal may randomly select specific resources from among the pre-allocated resources. In this case, a portion of the pre-allocated resources may be used for the retransmission, and the remaining resources may not be used. Since the remaining resources are resources pre-allocated by the base station, other terminals cannot use the remaining resources, but since the remaining resources are not used for transmission, interference to other terminals may be reduced. A shared resource pool may be configured for the mode 1 and the mode 2. In this case, since the terminal supporting the mode 2 can use the remaining resources in the shared resource pool by performing a resource sensing operation and/or a resource selection operation, the resource usage efficiency may be improved.

The changed number, size, and/or location of subchannel (s) for the retransmission CBGs may be indicated by control information (e.g., SCI) for the retransmission CBGs, and a bitmap in the corresponding control information may indicate which CBGs among all the CBGs in the TB are to be retransmitted. That is, the transmitting terminal may transmit the control information (e.g., SCI) including the bitmap indicating a portion of CBGs to be retransmitted among all the CBGs. The corresponding control information may be transmitted before the retransmission of the portion of the CBGs. In the retransmission procedure, the method of changing the MCS and the method of changing the subchannel size (e.g., the number of subchannels) may be simultaneously applied.

When the mode 1 is used, the terminal may report a HARQ response for sidelink transmission to the base station. When a dynamic grant is used in the sidelink communication, the maximum number of retransmissions between terminals may be configured by the base station. When a configured grant is used in the sidelink communication, the maximum number of retransmissions may be configured for each configured grant. In addition, the maximum number of retransmissions may be configured for each priority.

After retransmitting data by the maximum number of retransmissions, the terminal may report a HARQ response for the data to the base station. Since the maximum number of retransmissions is configured by the base station when a dynamic grant is used, the terminal may report a HARQ response for data to the base station according to scheduling information of the base station regardless of the number of (re)transmissions. When a configured grant is used, the terminal may report a HARQ response for data to the base station after retransmitting the data by the maximum number of retransmissions. In order to support the above operation, the terminal may have information on the number of (re) transmissions.

When a half-duplex problem occurs at the transmission time of the data, in which a transmission timing and a reception timing overlap, or when selective transmission is required according to intra-UE prioritization, the terminal may not transmit data actually. A method to decide whether to include the above situation in the number of retransmissions may be required. For example, even when (re)transmission of data is not actually performed at the (re)transmission time of data, the above situation may be included in the number of retransmissions. Specifically, the terminal may increase the number of retransmissions regardless of whether the data is actually (re)transmitted at the (re) transmission time of the data. In the sidelink communication, it may be difficult for the base station to know the data transmission/reception status between terminals. Therefore, it may be difficult for the base station to confirm whether the data scheduled by the configured grant is actually (re) transmitted.

Since the base station knows the resource configured by the configured grant, the base station may predict that the (re)transmission of the data according to the configured grant is to be performed by the maximum number of retransmissions after a specific time point. Accordingly, since the base station can predict a reporting time of a HARQ response according to the configured grant, the base station may prepare for receiving the HARQ response from the terminal. The terminal may increase the number of retransmissions even when the data is not actually (re) transmitted at the (re)transmission time of the data in order to transmit the HARQ response expected by the base station at the preconfigured time point. The terminal may report the HARQ response to the base station when the maximum number of retransmissions is reached.

Alternatively, if the (re)transmission of the data does not actually occur at the (re)transmission time of the data, the terminal may not increase the number of retransmissions. The maximum number of retransmissions may be a value configured in advance to ensure reliable data reception in consideration of the priority of the data, etc. Therefore, even when the (re)transmission of the data does not actually occur, if this situation is included in the number of retransmissions, the actual number of (re)transmissions of the data may be less than the maximum number of retransmissions. In this case, reliable reception of the data may be difficult. Therefore, when the (re)transmission of the data does not actually occur, for reliable reception of the data, this situation may not be included in the number of retransmissions. That is, only when the (re)transmission of the data actually occurs, the terminal may increase the number of retransmissions. Accordingly, only when the actual number of (re) transmissions of the data reaches the maximum number of retransmissions, the terminal may report HARQ information to the base station. Therefore, reliable reception performance of the data may be guaranteed.

After retransmitting sidelink data by the maximum number of retransmissions, the transmitting terminal may report a HARQ response (e.g., HARQ-ACK information) for the corresponding data to the base station. When there is an SL HARQ response received through a PSFCH, the transmitting terminal may perform the reporting operation based on the corresponding SL HARQ response.

The SL HARQ response may not be received through the PSFCH. For example, the SL HARQ response may not be received due to a priority between transmission and reception. In this case, information that the transmitting terminal should report to the base station may be unclear. When the transmitting terminal that has retransmitted sidelink data by the maximum number of retransmissions reports the SL HARQ response for the corresponding sidelink data to the base station, the transmitting terminal may always report ACK to the base station if there is no SL HARQ response obtained from the receiving terminal. Regardless of whether data reception is successful, the ACK may always be transmitted, and the base station may determine that the retransmission operation has been completed as many times as the maximum number of retransmissions based on the ACK.

Alternatively, when the transmitting terminal that has retransmitted sidelink data as many times as the maximum number of retransmissions reports the SL HARQ response for the corresponding sidelink data to the base station, the transmitting terminal may always report NACK to the base station if there is no SL HARQ response obtained from the receiving terminal. According to this operation, reliable reception of the data may be possible.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a receiving terminal in sidelink communications, the operation method comprising:
   receiving one or more transport blocks (TBs) from a transmitting terminal;
   generating hybrid automatic repeat request (HARQ) responses for code block groups (CBGs) included in each of the one or more TBs;
   selecting one or more HARQ responses from among the HARQ responses based on priorities;
   identifying a CBG index associated with each of the one or more HARQ responses;
   determining a physical sidelink feedback channel (PSFCH) resource based on the CBG index among a plurality of PSFCH resources; and
   transmitting the one or more HARQ responses to the transmitting terminal through the PSFCH resource.

2. The operation method according to claim 1, wherein the priorities are TB priorities, and when a plurality of TBs are received from the transmitting terminal, HARQ responses for CBGs included in a TB having a high priority among the plurality of TBs are preferentially selected.

3. The operation method according to claim 1, wherein the priorities are CBG priorities, and a HARQ response for a CBG having a lower index among the CBGs is preferentially selected.

4. The operation method according to claim 1, wherein the priorities are priorities of HARQ responses, and a HARQ response indicating an acknowledgment (ACK) among the HARQ responses is preferentially selected.

5. The operation method according to claim 1, wherein a PSFCH format 1 for transmission of the one or more HARQ responses is configured, and the PSFCH resource is a resource for the PSFCH format 1.

6. The operation method according to claim 5, wherein the PSFCH format 1 shares a same resource region with a PSFCH format 0 for transmission of one HARQ response, and a transmission resource of the PSFCH format 1 is indicated in a same manner as a transmission resource of the PSFCH format 0.

7. The operation method according to claim 5, wherein a resource region of the PSFCH format 1 is configured independently from a resource region of a PSFCH format 0 for transmission of one HARQ response, and the resource region of the PSFCH format 1 is indicated by a higher layer message and/or sidelink control information (SCI).

8. The operation method according to claim 1, wherein when a PSFCH format 0 and a PSFCH format 1 are configured, a PSFCH format used for transmission of the one or more HARQ responses is selected according to a preconfigured rule.

9. An operation method of a transmitting terminal in sidelink communications, the operation method comprising:
   transmitting one or more transport blocks (TBs) to a receiving terminal through n subchannels;
   receiving, from the receiving terminal, one or more hybrid automatic repeat request (HARQ) responses selected based on priorities from among HARQ responses for code block groups (CBGs) included in each of the one or more TBs through a physical sidelink feedback channel (PSFCH) resource; and
   retransmitting a portion of the CBGs to the receiving terminal through m subchannels when retransmission is required for the portion of the CBGs among all CBGs included in the one or more TBs,
   wherein each of n and m is a natural number.

10. The operation method according to claim 9, wherein n is greater than m, a subchannel having a lower index among the n subchannels is preferentially selected, and the m subchannels selected among the n subchannels are used for retransmission of the portion of the CBGs.

11. The operation method according to claim 9, wherein a first modulation and coding scheme (MCS) is used for transmission of the one or more TBs, a second MCS is used for retransmission of the portion of the CBGs, and an index of the second MCS is lower than an index of the first MCS.

12. The operation method according to claim 9, wherein the priorities are TB priorities, and when a plurality of TBs are transmitted, HARQ responses for CBGs included in a TB having a high priority among the plurality of TB s are preferentially selected.

13. The operation method according to claim 9, wherein the priorities are CBG priorities, and a HARQ response for a CBG having a lower index among the CBGs is preferentially selected.

14. The operation method according to claim 9, wherein the priorities are priorities of HARQ responses, and a HARQ response indicating an acknowledgment (ACK) among the HARQ responses is preferentially selected.

15. The operation method according to claim 9, further comprising transmitting a bitmap indicating the portion of the CBGs retransmitted among all the CBGs.

16. A receiving terminal in sidelink communications, the receiving terminal comprising:
- a processor;
- a memory electronically communicating with the processor; and
- instructions stored in the memory,
- wherein when executed by the processor, the instructions cause the receiving terminal to:
  - receive one or more transport blocks (TBs) from a transmitting terminal;
  - generate hybrid automatic repeat request (HARQ) responses for code block groups (CBGs) included in each of the one or more TBs;
  - select one or more HARQ responses from among the HARQ responses based on priorities;
  - identify a CBG index associated with each of the one or more HARQ responses;
  - determine a physical sidelink feedback channel (PSFCH) resource based on the CBG index among a plurality of PSFCH resources; and
  - transmit the one or more HARQ responses to the transmitting terminal through the PSFCH resource.

17. The receiving terminal according to claim 16, wherein a PSFCH format 1 for transmission of the one or more HARQ responses is configured, the PSFCH format 1 shares a same resource region with a PSFCH format 0 for transmission of one HARQ response, and a transmission resource of the PSFCH format 1 is indicated in a same manner as a transmission resource of the PSFCH format 0.

18. The receiving terminal according to claim 16, wherein a PSFCH format 1 for transmission of the one or more HARQ responses is configured, a resource region of the PSFCH format 1 is configured independently from a resource region of a PSFCH format 0 for transmission of one HARQ response, and the resource region of the PSFCH format 1 is indicated by a higher layer message and/or sidelink control information (SCI).

* * * * *